United States Patent
Charmillot

(10) Patent No.: US 9,371,861 B2
(45) Date of Patent: Jun. 21, 2016

(54) SWAGED BEARING ASSEMBLY WITH A FLANGE MOUNTED THEREON

(71) Applicant: Roller Bearing Company of America, Inc., Oxford, CT (US)

(72) Inventor: Philippe Charmillot, Rebeuvelier (CH)

(73) Assignee: ROLLER BEARING COMPANY OF AMERICA, INC., Oxford, CT (US)

( * ) Notice: Subject to any disclaimer, the term of this patent is extended or adjusted under 35 U.S.C. 154(b) by 0 days.

(21) Appl. No.: 14/619,862

(22) Filed: Feb. 11, 2015

(65) Prior Publication Data

US 2015/0226264 A1    Aug. 13, 2015

Related U.S. Application Data

(60) Provisional application No. 61/938,240, filed on Feb. 11, 2014.

(51) Int. Cl.

| | |
|---|---|
| *F16C 35/02* | (2006.01) |
| *F16C 23/04* | (2006.01) |
| *F16C 33/74* | (2006.01) |
| *F16C 11/06* | (2006.01) |
| *F16C 11/08* | (2006.01) |
| *B23P 11/00* | (2006.01) |

(52) U.S. Cl.
CPC ............... *F16C 35/02* (2013.01); *B23P 11/005* (2013.01); *F16C 11/0671* (2013.01); *F16C 11/0685* (2013.01); *F16C 11/0695* (2013.01); *F16C 23/043* (2013.01); *F16C 33/74* (2013.01); *B23P 2700/11* (2013.01); *F16C 11/0619* (2013.01)

(58) Field of Classification Search
CPC .... F16C 11/06; F16C 11/0666; F16C 11/103; Y10T 403/32631; F16J 15/52
USPC ......... 384/130, 140, 206, 209, 215, 322, 428, 384/436, 103; 403/50, 71, 122, 132, 135, 403/90, 114
See application file for complete search history.

(56) References Cited

U.S. PATENT DOCUMENTS

| | | | |
|---|---|---|---|
| 2,898,671 A | | 2/1955 | Heim |
| 3,749,431 A | * | 7/1973 | Schmid et al. ................ 403/122 |

(Continued)

FOREIGN PATENT DOCUMENTS

| | | |
|---|---|---|
| DE | 10314902 C5 | 9/2010 |
| GB | 1067426 A  * | 5/1967 ............. F16C 11/06 |

(Continued)

OTHER PUBLICATIONS

Extended European Search Report issued in corresponding EP Application No. 15154655.3, dated Oct. 7, 2015, pp. 1-6.

*Primary Examiner* — Marcus Charles
(74) *Attorney, Agent, or Firm* — MKG, LLC

(57) ABSTRACT

A swaged bearing assembly includes a flange mounted thereon. A bearing inner member has an outer surface at least a portion of which defines an outer engagement surface. A bearing outer member is swaged around the inner member and the inner member is misalignable and rotatable in relation to the outer member. The outer member has an outer surface and an inner surface at least a portion of which defines an inner engagement surface. An area of engagement is defined by an interface of the inner engagement surface of the outer member and the outer engagement surface of the inner member. A flange is mounted on the outer surface of the outer member.

8 Claims, 2 Drawing Sheets

(56) References Cited

U.S. PATENT DOCUMENTS

| | | | |
|---|---|---|---|
| 3,853,414 A * | 12/1974 | Hirano et al. | 403/71 |
| 4,283,833 A * | 8/1981 | Pyles | 403/140 |
| 4,701,064 A * | 10/1987 | Mizusawa | 403/71 |
| 5,509,748 A | 4/1996 | Idosako et al. | |
| 5,538,275 A * | 7/1996 | Lomnick | 280/93.511 |
| 5,601,378 A | 2/1997 | Fukukawa et al. | |
| 5,611,635 A * | 3/1997 | Schutt et al. | 403/141 |
| 5,816,731 A | 10/1998 | Howard | |
| 5,855,448 A | 1/1999 | Showalter et al. | |
| 6,145,181 A * | 11/2000 | Murata et al. | 29/450 |
| 6,190,080 B1 * | 2/2001 | Lee | 403/135 |
| 6,527,468 B1 * | 3/2003 | Lindquist et al. | 403/122 |
| 6,530,711 B2 * | 3/2003 | Menotti | 403/135 |
| 6,814,521 B2 * | 11/2004 | Suzuki et al. | 403/134 |
| 6,935,803 B2 * | 8/2005 | Abels et al. | 403/50 |
| 7,134,801 B2 * | 11/2006 | Kuroda | 403/135 |
| 7,153,055 B1 * | 12/2006 | Dorr | 403/122 |
| 7,367,743 B2 * | 5/2008 | Bernhardt et al. | 403/122 |
| 7,658,546 B2 | 2/2010 | Clarke et al. | |
| 7,793,952 B2 * | 9/2010 | Kwon | 280/93.511 |
| 8,047,739 B2 | 11/2011 | Sellers et al. | |
| 8,616,800 B2 | 12/2013 | Abe et al. | |
| 8,684,621 B2 | 4/2014 | Forthaus et al. | |
| 2011/0092297 A1 | 4/2011 | Takabe | |
| 2013/0121754 A1 | 5/2013 | Kuroda et al. | |

FOREIGN PATENT DOCUMENTS

| | | | | |
|---|---|---|---|---|
| GB | 1374261 A * | 11/1974 | | |
| GB | 2420161 B | 4/2007 | | |
| GB | 2434844 A | 8/2007 | | |
| JP | 01307508 A * | 12/1989 | | F16C 11/06 |
| JP | 07260066 A | 10/1995 | | |
| JP | 2001323923 A * | 11/2001 | | F16C 11/06 |
| JP | 3631253 B2 | 3/2005 | | |
| JP | 2008223946 A * | 9/2008 | | |
| JP | 2014037844 A | 2/2014 | | |
| WO | 2013143582 A1 | 10/2013 | | |

* cited by examiner

SWAGED BEARING ASSEMBLY WITH A FLANGE MOUNTED THEREON

CROSS REFERENCE TO RELATED APPLICATIONS

This application claims the benefit of U.S. Provisional Patent Application Ser. No. 61/938,240, filed on Feb. 11, 2014, which is incorporated herein by reference in its entirety.

FIELD OF THE INVENTION

This invention relates to a bearing assembly having an outer member swaged around an inner member. More particularly, this invention relates to a swaged bearing assembly having a flange mounted on the outer member.

DESCRIPTION OF THE RELATED ART

Bearings, particularly spherical plain bearings, can be used to reduce friction between moving parts of a mechanical assembly. Spherical bearing assemblies traditionally have been comprised of an inner member positioned for rotational movement within an outer member. The inner member typically comprises a ball having a spherical outer diameter that defines an outer engagement surface and, typically, a bore passes through the ball. The outer member typically comprises an outer ring or race having a spherical inner diameter that defines an inner engagement surface contoured to receive and retain the inner member therein. A lubricant gel, paste, powder, dry film, or liquid such as grease, or a low-friction liner, is typically provided between the inner member and the outer member to reduce friction therebetween.

A shaft or like rotationally actionable member typically extends through the bore of the inner member and is fixedly attached therein. A housing portion of a mechanical assembly or like structural member typically encases the outer member and is fixedly attached thereto. Thus, the shaft or like rotationally actionable member is moveable in relation to the housing or like structural member. The shaft or like rotationally actionable member can be integrally formed with the inner member; and the housing or like structural member can be integrally formed with the outer member.

Mounting the inner member into the outer member of the spherical bearing assembly has proved difficult since any method must result in the operating torque of the bearing being either substantially zero or within an often very narrow, predetermined, range. One conventional method comprises swaging the outer member around the inner member to fixedly retain the inner member therein; however, the outer member is plastically deformed by the swaging process. For example, a full swage process for manufacturing a bearing 110 includes forming an outer ring 130 around a ball 120 as shown in FIG. 3A. The outer ring 130 has a cylindrical outer surface 132 and a cylindrical inner surface 134 extending between opposing axial ends of the outer ring 130. The ball 120 is positioned in the outer ring 130 and a press rod 190 engages an axial end of the ball 120 and the outer ring 130 and forces the ball 120 and outer ring 130 through a tapered die 195. The tapered die 195 defines an initial cylindrical inner surface 196A, a tapered inner surface 196B and a finishing inner surface 196C. As a result of forcing the ball 120 and the outer ring 130 through the tapered die 195, the cylindrical inner surface 134 conforms to the shape of the ball 120 and plastically deforms radially inward in the direction of the arrow R, so that the inner surface 134' engages the ball 120, as shown in FIG. 3B A problem with bearings manufactured from the full swage process is that the outer surface 132 must be free of obstructions or apprentices to clear the inner surfaces 196A, 196B and 196C of the tapered die 195. Thus, it is difficult to secure the outer ring 130 of a full swaged bearing 110 to a housing.

Use of half swage bearings do not solve this problem. For example, FIG. 4A illustrates a half swage bearing 210 having a ball 220 and an outer ring 230. The outer ring 230 defines a substantially cylindrical outer surface 232. Before swaging, the outer ring 230 has a cylindrical inner surface 234A extending axially partially into the outer ring 230 and transitioning to a spherical inner surface 234B formed in the outer ring 230. The bearing 230 is manufactured by a swaging process wherein the ball is positioned in the outer ring 230 so that the ball 220 seats in the spherical inner surface 234B. The outer ring 230 is then forced through a tapered die 195 similar to that illustrated in FIG. 3A, to conform the inner surface 234A to the shape of the ball 220 and plastically deform the outer ring 230 radially inward in the direction of the arrow R, so that the inner surface 234A' engages the ball 220, as shown in FIG. 4B. A problem with bearings manufactured from the half swage process is that the outer surface 232 must be free of obstructions or apprentices to clear the inner surfaces 196A, 196B and 196C of the tapered die 195. Thus, it is difficult to secure the outer ring 230 of a full swaged bearing 210 to a housing.

SUMMARY OF THE INVENTION

In one aspect, the present invention resides in a bearing assembly with a flange mounted thereon. The bearing assembly includes an inner member having an outer surface at least a portion of which defines an outer engagement surface. The bearing assembly includes an outer member swaged around the inner member. The inner member is misalignable and rotatable in relation to the outer member. The outer member has an outer surface and an inner surface at least a portion of which defines an inner engagement surface. An area of engagement is defined by an interface of the inner engagement surface of the outer member and the outer engagement surface of the inner member. The bearing assembly has a flange mounted on the outer surface of the outer member.

DETAILED DESCRIPTION OF THE INVENTION

Figure 1:
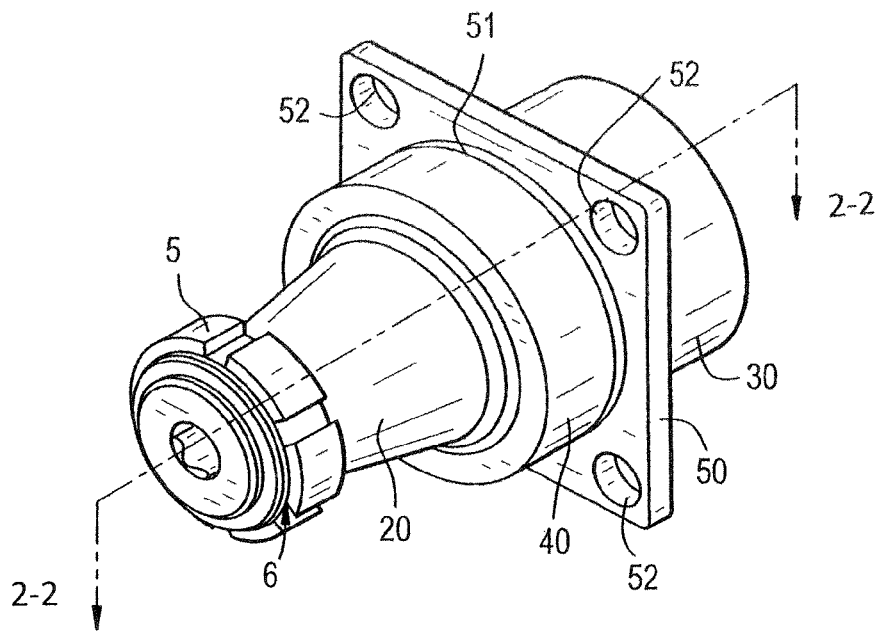
FIG. 1 is a perspective view of a full swaged bearing assembly with a flange mounted thereon in accordance with the present invention.
Figure 3A:
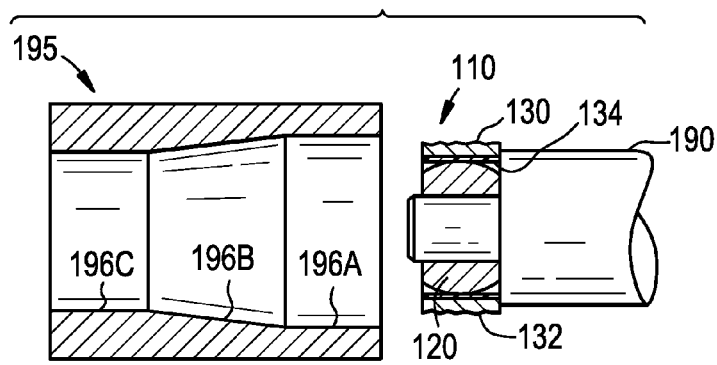
FIG. 3A is a cross sectional view of a ball and outer ring positioned proximate an entry of a tapered die, for a full swage process of forming the outer ring around the ball.

A swaged bearing assembly is shown in FIG. 1 designated generally by the reference number 10 and is hereinafter referred to as "bearing assembly 10." The bearing assembly 10 includes an integrally formed rotationally actionable inner member 20 and an integrally formed structural member or housing and outer member 30 in which the inner member 20 is received. The outer member 30 is swaged around the inner member 20 to rotatably retain the inner member 20 therein; and the inner member 20 is misalignable and rotatable in relation to the outer member 30. The outer member 30 is positioned coaxially around the inner member 20 such that there is essentially no compression of the inner member 20. Uniform compressive forces are applied to the outer member 30 (e.g., via a tapered die 195 as shown in FIG. 3A) causing a uniform compression and plastic deformation of the outer member 30 such that the inner member 20 is retained in (e.g., swaged around) the outer member 30. A sealing member 40 is positioned annularly around the interface of the inner member 20 and the outer member 30. A flange 50 is mounted to the outer member 30 after the swaging, such that the bearing assembly 10 can be mounted to a housing or other structural member (not shown). The flange 50 defines a bore 51 for receiving the outer member 30 therethrough. In one embodiment, the flange 50 includes one or more apertures 52 for receiving a fastener (not shown) therethrough for mounting the bearing assembly 10 to the housing or other structural member.

Figure 2:
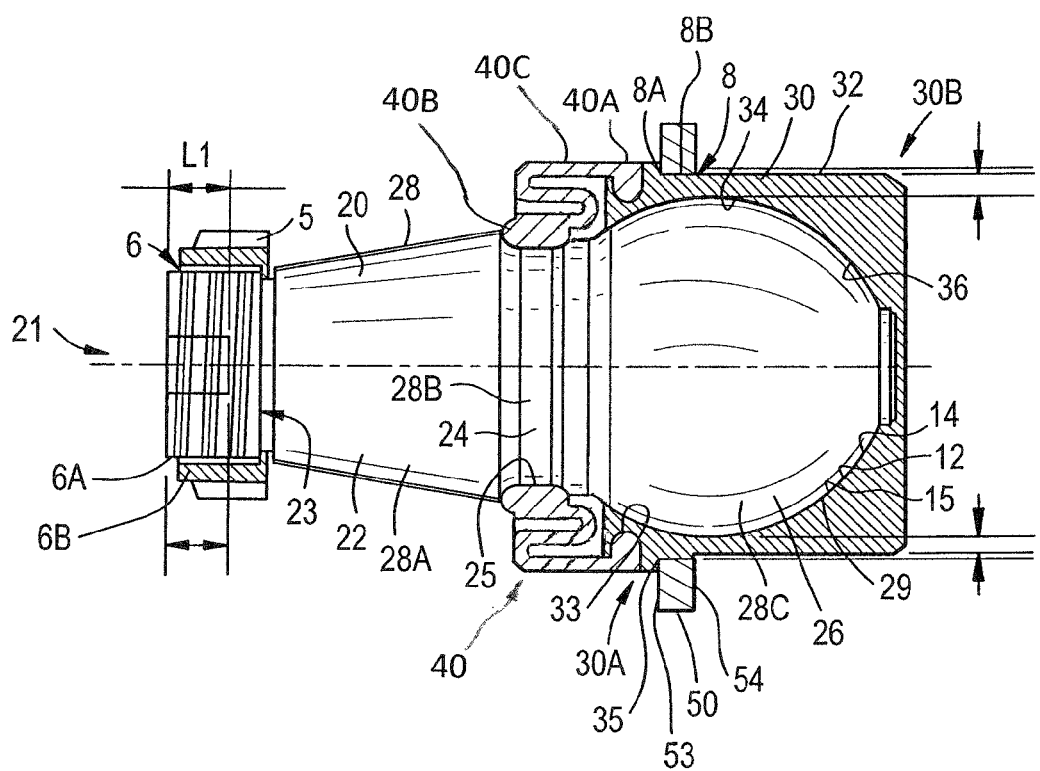
FIG. 2 is a perspective view of the swaged bearing assembly of FIG. 1 taken along line 2-2 of FIG. 1.

As shown in FIG. 2, the inner member 20 is integrally formed having a rotationally actionable first end 22, an annular seal interface 24, and a spherical second end 26. The inner member 20 defines an outer surface 28, for example a cylindrical outer surface. The outer surface 28 of the inner member 20 includes a first section 28A defined by the first end 22, a second section 28B defined by the seal interface 24, and a third section 28C defined by the second end 26. The third section 28C of the outer surface 28 of the inner member 20 defines a first outer engagement surface 29 of the inner member 20. The second section 28B of the outer surface 28 of the inner member 20 defines a second outer engagement surface 25 of the inner member 20. In one embodiment, the inner member 20 is fixedly attached to a rotationally actionable structural member 5 for example by threaded engagement 6. In one embodiment, threaded engagement 6 includes external threads 6A defined in an axially outward portion 23 of the first end 22 of the inner member 20, and corresponding internal threads 6B defined in the structural member 5. In one embodiment, the axially outward portion 23 of the first end 22 of the inner member 20 defines a bore 21 extending partially therethrough. In one embodiment, the inner member 20 includes a bore at least partially therethrough for receiving a shaft or pin therein.

The outer member 30 defines an axial first end 30A and an axial second end 30B, and includes an outer surface 32 and an inner surface 34, at least a portion of which defines an inner engagement surface 36. After the outer ring is swaged onto the inner member, the inner engagement surface 36 of the outer member 30 slidingly engages or receives the first outer engagement surface 29 of the inner member 20. When the inner member 20 is disposed in the outer member 30, an area of engagement 12 is defined by an interface of the inner engagement surface 36 of the outer member 30 and the first outer engagement surface 29 of the inner member 20. In one embodiment, a lubricant 14, such as for example grease, is disposed within the area of engagement 12. The term "lubricant" as used herein includes installing in the area of engagement 12, or on one or both of the inner engagement surface 36 and the first outer engagement surface 29, a coating exhibiting low-friction and high-wear properties, a low-friction liner, a lubricious fabric liner, and the like. In one embodiment, the bearing assembly 10 includes a self-lubricating liner 15 disposed in the area of engagement 12. In one embodiment, the lubricant 24 comprises a high-temperature solid film lubricant, often referred to as a dry film, which is rated for high-temperature environments, for example in excess of 500° F.

In one embodiment and as further shown in FIG. 2, the sealing member 40 of the bearing assembly 10 is in the form of an annular telescopic shield for inhibiting the ingress of contaminants into the bearing assembly 10, particularly the area of engagement 12, and prevents such contaminants from impinging the inner engagement surface 36 of the outer member 30 and the first outer engagement surface 29 of the inner member 20. Sealing member 40 has an axial first end 40A and an axial second end 40B with a folded over portion 40C extending therebetween. In one embodiment and as shown in FIG. 2, the axial first end 40A sealingly engages an annular groove 33 formed in the outer surface 32 of outer member 30 and the axial second end 40B sealingly engages the second section 28B of the outer surface 28 of the inner member 20.

The flange 50 is mounted or fixedly attached to the outer member 30 after the outer member 30 has been swaged around the inner member 20. The outer member 30 defines a shoulder 35 proximate to the axial first end 30A and extending radially outwardly from the outer surface 32 of the outer member 30. When the flange 50 is fixedly attached to the outer member 30, a first axial face 53 of the flange 50 abuts the shoulder 35 of the outer member 30. A second axial face 54 of the flange 50 is configured to engage a housing or other structural member (not shown).

In one embodiment, the flange 50 is fixedly attached to the outer member 30 by threaded engagement 8. In one embodiment, threaded engagement 8 includes external threads 8A defined in the outer member 30 proximate to the shoulder 35, and corresponding internal threads 8B defined in the bore 51 of the flange 50. The external threads 8A are formed in the outer member 30 after the swaging of the outer member 30 around the inner member 20. Thus, the flange 50 is mounted to the outer member 30 after the swaging process by threaded engagement and assists in the retention of the bearing assembly 10 in the housing or other structural member (not shown). The flange 50 also increases the stiffness of the outer member 30. Although the flange 50 has been described as threadedly engaging the outer member 30, other methods for securing the flange 50 to the outer member 30, such as, for example, by press fit and other like fastening means, or by cooling the outer member 30 and heating the flange 50, are considered within the scope of the invention.

The inner member 20 is fabricated from a steel or a steel alloy, including but not limited to, AISI 52100, AISI 440C, 4340 or 4130 alloy steel, 17-4PH, 15-5PH, 13PH-8MO. The inner member 20 also can be fabricated from other metals including, but not limited to, aluminum and aluminum alloys, copper and copper alloys, titanium, as well as composites and ceramics. The inner member 20 can be fabricated from other materials that are sufficiently hard or can be sufficiently hardened through heat treatment or other hardening treatments such as for example cold working or case carburizing. The inner member 20 can be plated or coated, and a self-lubricating treatment can be applied to the contoured surface of the inner member 12.

The outer member 30 is fabricated from a steel or a steel alloy, including but not limited to, 4340, 4130, 17-4PH.

15-5PH, 13PH-8MO. The outer member 30 also can be fabricated from other metals including, but not limited to, aluminum and aluminum alloys, copper and copper alloys, as well as composites or another suitable material. In some embodiments the material may have a lower hardness that allows the outer member 30 to be formed in a press operation around the inner member 20, while still having adequate strength to handle forces during operation of the bearing assembly 10. The outer member 30 can be fabricated from a material that provides a sufficient mating surface to a self-lubricating coating composition. The inner member 20 and the outer member 30 can be fabricated from the same or different materials.

Figure 3B:
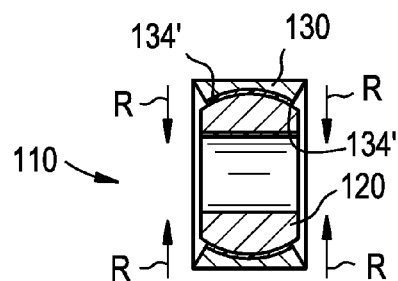
FIG. 3B is cross sectional view of an outer ring formed around the ball of FIG. 3A after the exiting the die of the full swage process of FIG. 3A.
Figure 4A:
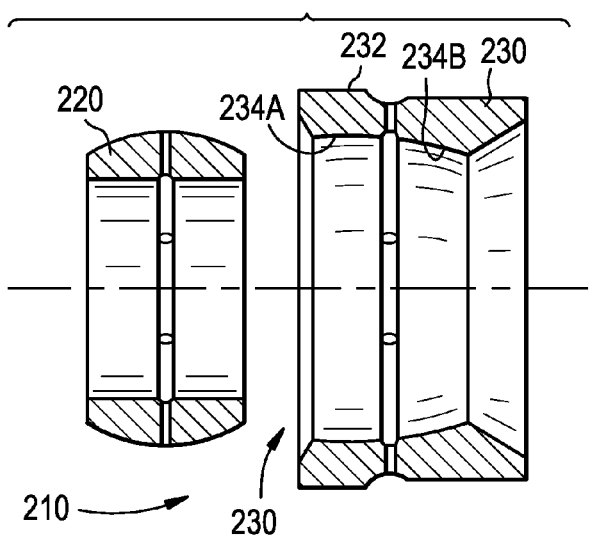
FIG. 4A is cross sectional view of a ball and outer ring a half swage process of forming the outer ring around the ball.
Figure 4B:
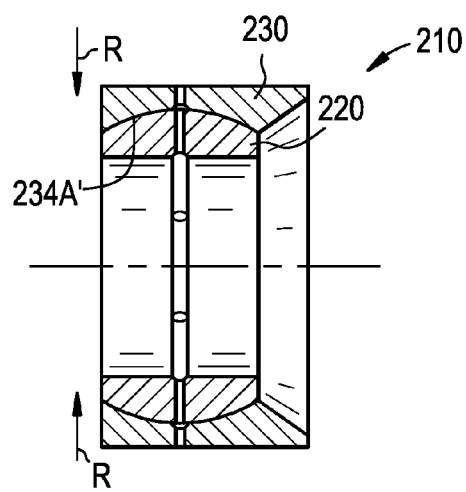
FIG. 4B is cross sectional view of the outer ring formed around the ball of FIG. 4A as a result of the half swage process of FIG. 4A.

The swaged bearing assembly 10 having the flange 50 mounted thereon in accordance with the present invention provides a flanged design configured for use with a full swaged bearing design (FIGS. 3A and 3B) or a half swage bearing design (FIGS. 4A and 4B). The swaged bearing assembly 10 having the flange 50 mounted thereon solves the problems associated with mounting outer member of bearings manufactured via a full or half swage method to housing because of the outer surface having to pass through and clear a tapered inner surface of a die (e.g., die 195 of FIG. 3A). Thus, the bearing 10 of the present invention can employ one or more flanges positioned thereon, for example by the mounting of flanges thereon after the swaging process. Moreover, mounting the flange 50 proximate an axial end of the outer member 30 reinforces the stiffness of the axial first end 30A of the outer member 30 and increases the axial push-out load limit of the bearing assembly 10.

Although the invention has been described with reference to particular embodiments thereof, it will be understood by one of ordinary skill in the art, upon a reading and understanding of the foregoing disclosure that numerous variations and alterations to the disclosed embodiments will fall within the spirit and scope of this invention and of the appended claims.

What is claimed is:

1. A bearing assembly comprising:
    an inner member, the inner member having an outer surface at least a portion of which defines an outer engagement surface;
    an outer member, the outer member being a metallic ring swaged around the inner member, the inner member being misalignable and rotatable in relation to the outer member, the outer member having an outer surface and an inner surface at least a portion of which defines an inner engagement surface;
    an area of engagement defined by an interface of the inner engagement surface of the outer member and the outer engagement surface of the inner member; and
    a flange mounted on the outer surface of the outer member.

2. The bearing assembly of claim 1, further comprising:
    a shoulder extending radially outwardly from the outer surface of the outer member; and
    a first axial face of the flange abutting the shoulder of the outer member when mounted thereon.

3. The bearing assembly of claim 1, further comprising:
    the flange being fixedly attached to the outer member by threaded engagement.

4. The bearing assembly of claim 1, further comprising:
    a sealing member positioned annularly around the area of engagement.

5. The bearing assembly of claim 4, the sealing member comprising:
    an annular telescopic shield sealing member.

6. The bearing assembly of claim 1, further comprising:
    a lubricant disposed in the area of engagement.

7. The bearing assembly of claim 1, wherein the flange is positioned proximate an axial end of the outer member.

8. The bearing assembly of claim 1, wherein the outer member has a cylindrical surface before and after swaging.

* * * * *